United States Patent

Ida et al.

[15] 3,696,206

[45] Oct. 3, 1972

[54] AUDIO DOSIMETER

[72] Inventors: Edward S. Ida; Alfred Lechner, both of Newark; James L. Parsons, Wilmington, all of Del.

[73] Assignee: E. I. du Pont de Nemours and Company, Wilmington, Del.

[22] Filed: Nov. 27, 1970

[21] Appl. No.: 93,167

[52] U.S. Cl. ..............................179/1 N, 181/0.5 AP

[51] Int. Cl. ............................G10l 1/00, G01h 3/12

[58] Field of Search........181/0.5 AP, 0.5 R; 179/1 N

[56] References Cited

UNITED STATES PATENTS

| | | | |
|---|---|---|---|
| 2,982,914 | 5/1961 | Stewart | 179/1 N |
| 3,597,542 | 8/1971 | Thornton | 179/1 N |
| 3,236,327 | 2/1966 | Church et al. | 181/0.5 |
| 3,280,937 | 10/1966 | Faber, Jr. et al. | 181/0.5 |
| 3,014,550 | 12/1961 | Gales et al. | 181/0.5 |
| 3,144,089 | 8/1964 | Lane et al. | 180/0.5 |
| 2,884,085 | 4/1959 | Von Witten et al. | 181/0.5 |

OTHER PUBLICATIONS

The Noise Cumulator by Jerome R. Cox Jr. in Noise Control, Jan. ' 59, pp. 54– 58 & p. 78

Development of a Personal Monitoring Instrument for Noise by F. W. Church, Industrial Hygiene Journal, Jan.– Feb. 1965 p. 59– 63

*Primary Examiner*—Benjamin A. Borchelt

*Assistant Examiner*—H. A. Birmiel

*Attorney*—Harry J. McCauley

[57] ABSTRACT

An audio dosimeter for individual use determining exposure to sound energy as a function of both frequency and pressure level, with integration over the time of exposure and incorporating storage means preserving a quantitative measure of the exposure.

2 Claims, 6 Drawing Figures

"A" Weighting Attenuation

Walsh-Healey Law Noise Criteria

INVENTORS
Edward S. Ida
Alfred Lechner
James L. Parsons
BY Harry J. McCauley
ATTORNEY INVENTORS
Edward S. Ida
Alfred Lechner
James L. Parsons
BY
Harry J. McCauley
ATTORNEY INVENTORS
Edward S. Ida
Alfred Lechner
James L. Parsons
BY Harry J. McCauley
ATTORNEY

AUDIO DOSIMETER

BRIEF SUMMARY OF THE INVENTION

Generally, this invention comprises an audio dosimeter for individual use comprising, in series circuit in the order recited, electronic microphonic sound sensor means, a high impedance first operational amplifier receiving the A-C voltage output of the sound sensor, an "A" weighting network receiving the A-C voltage output constituting a measure of the ambient sound energy magnitude from the first high impedance operational amplifier and quantitatively altering it to relatively proportion its individual components to conform to a preselected frequency attenuation pattern modeling the otolaryngicologically (and psychologically) harmful contribution of ambient sound frequency, a second operational amplifier effecting a preselected gain and final high frequency attenuation of the A-C voltage signal, a fullwave rectifier provided with diodes having a preselected threshold conductance effecting a limiting low voltage level signal input, each output side of said rectifier having a resistor in series connection therewith, a capacitor having a capacitance effecting a substantial peak-storing action connected in shunt with respect to said rectifier, and an electrochemical integrating cell in shunt connection with said capacitor measuring sound exposure in terms of sound pressure with weighted frequency and time of exposure conjointly.

DRAWINGS

The following drawings detail a preferred embodiment of the invention and the physical principles of operation:

FIG. 1 is a plot of the Walsh-Healey Law permissible human exposure time in hours/day v. sound pressure level in decibels "A" weighting network (i.e., dBA), FIG. 2 is a schematic circuit diagram for a preferred embodiment of apparatus according to this invention, as to which FIG. 2A is a schematic of the operating voltage supply, FIG. 2B is a schematic circuit diagram for a second embodiment of apparatus according to this invention.

FIG. 3 is a graphic representation of "A" Weighting Attenuation in terms of decibels referred to $2 \times 10^{-4}$ microbar v. frequency in cps (logarithmic scale), and FIG. 4 is a plot of cell current in microamperes as ordinate v. sound exposure in terms of linear intensity in volts as abscissa for the apparatus of FIGS. 2 and 2A.

GENERAL

The physiologically (and psychologically) injurious effects of sound energy have been appreciated for a long time; however, it has only been since the passage of the Walsh-Healey Law that quantitative limits have been set on human exposure. The official standards prescribed are set forth in the Federal Register, Vol. 35, No. 17 - Saturday, Jan. 24, 1970.

The legislative Permissable (Human) Noise Exposures settled upon are (wherein "dBA" represents "A" Weighted Sound Pressure Level):

TABLE I

| Duration Per day, hours | Sound Pressure Level, dBa slow response |
|---|---|
| 8 | 90 |
| 6 | 92 |
| 4 | 95 |
| 3 | 97 |
| 2 | 100 |
| 1½ | 102 |
| 1 | 105 |
| 178 | 110 |
| ¼ or less | 115 |

In explanation of Table I, the footnote (1) applicable thereto reads: "When the daily noise exposure is composed of two or more periods of nose exposure at different levels, their combined effect should be considered, rather than the individual effect of each. If the sum of the following fractions: $C_1/T_1 + C_2/T_2 + \ldots C_n/T_n$ exceeds unity, then, the mixed exposure should be considered to exceed the limit value. $C_n$ indicates the total time of exposure at a specified noise level and $T_n$ indicates the total time of exposure permitted at that level."

In addition, Section 50–204.10, "Occupational noise exposure", of the legislation requires that protection be provided to employees subjected to sound exceeding the limits of Table I, and that, in all cases where sound levels exceed the tabulated values, "a continuing effective hearing conservation program shall be administered".

The graphical relationship of permissible human exposure time in hours/day versus sound level in dBA set out in Table I is shown in FIG. 1

From the foregoing, it is seen that individual employee monitoring analogous to that heretofore provided for workers exposed to nuclear radiation or the like is now mandatory as regards noise. This can only be provided by portable individual audio dosimeters, worn by the employee during his entire work day, not only in the work area itself but also in the cafeteria, change house, or anywhere else he may visit on either a regular or irregular basis, and also facilities for daily quantitative read-out and recording of consummated exposures to permit appropriate duty assignments in the conduct of hearing conservation programs, as well as the identification of work areas of potential auditory peril.

DETAILED DESCRIPTION

The audio dosimeter of this invention is small (typically 2⅞ inch × 1½ inch ×3 15/16 inch) and compact in size, light in weight (typically less than 8 ounces), and can be carried comfortably by the employee (as by a neck band, belt or pocket clip or the like) without inconvenience or hindrance to work activities. Moreover, the dosimeter is reasonable in cost and rugged in design, so that it is wellsuited to service in demanding industrial environments.

Figure 2B:
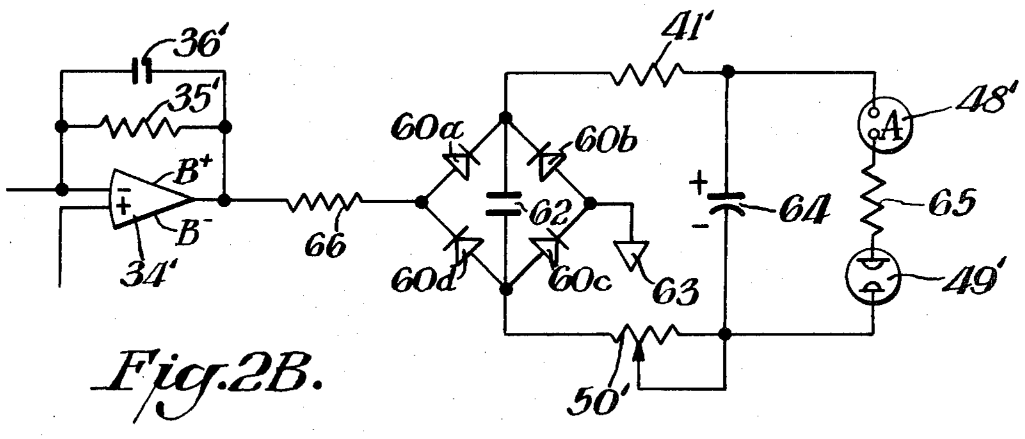
Figure 2:
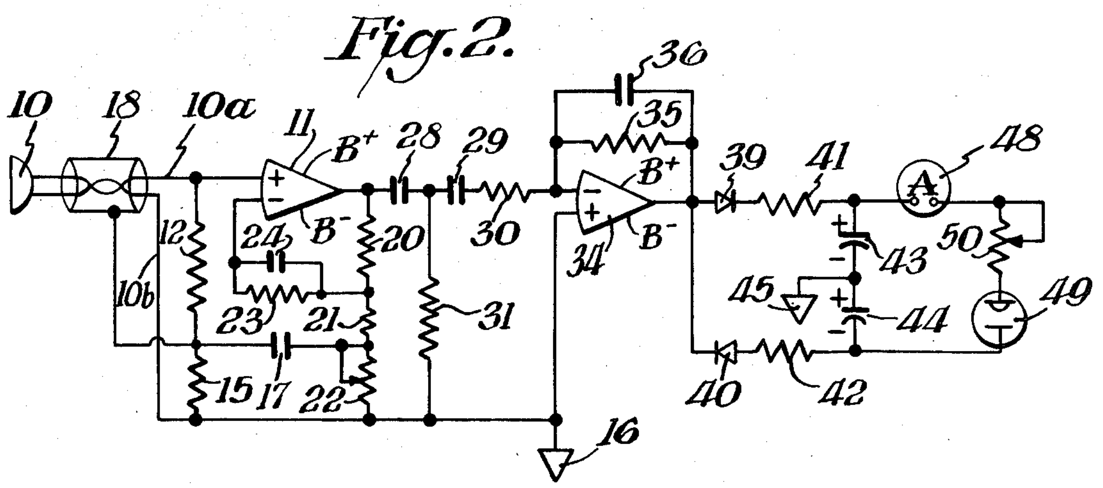

Referring to FIG. 2, there is shown a schematic circuit diagram of a preferred embodiment of this invention in which the microphonic sound sensor 10 can typically by a Shure Bros., Inc. ceramic precision microphone, Model 99 A 401 B having an impedance of 460 mmfd. at 80° F. and a nominal level characteristic of 59.5 dB below 1 v. per microbar at 400 cps measured in a free field at a distance of 12 inches from the sound source.

Microphone 10 has a high impedance terminal 10a connected to the + input (non-inverting) of a first operational amplifier 11, which can typically be a Phillbrick-Nexus Model 1402, and to a 15 megohm resistor 12, so as to present a high input impedance to the signal source.

A "bootstrap" circuit constituting resistor 12 and 1 megohm resistor 15 connected in series therewith to common potential reference 16 (which may be grounded or simply left floating) is provided with common resistor junction driven by the 0.01 mfd. capacitor 17 coupled to the amplifier output. This circuit drives the input cable shield 18 to reduce its effective capacitance and thereby reduce its signal shunting effect. This also drives resistor 12, raising its effective or apparent resistance.

The stage gain is established by the series resistor network made up of resistor 20 (typically 39 Kohms), resistor 21 (typically 510 ohms) and gain adjusting rheostat 22 (typically 5 Kohms). Since a relatively high value resistor is used in the amplifier positive polarity input terminal, this is balanced by a similar 15 Megohm resistor 23 in the negative input. A shunting capacitor 24 (typically 500 pf.), approximately equal to the microphone 10 capacitance, is employed to preserve good frequency response.

With the circuit detailed, at a typical gain setting of X12 for the input stage, the improvement in input impedance is nearly a factor of ten.

Figure 3:
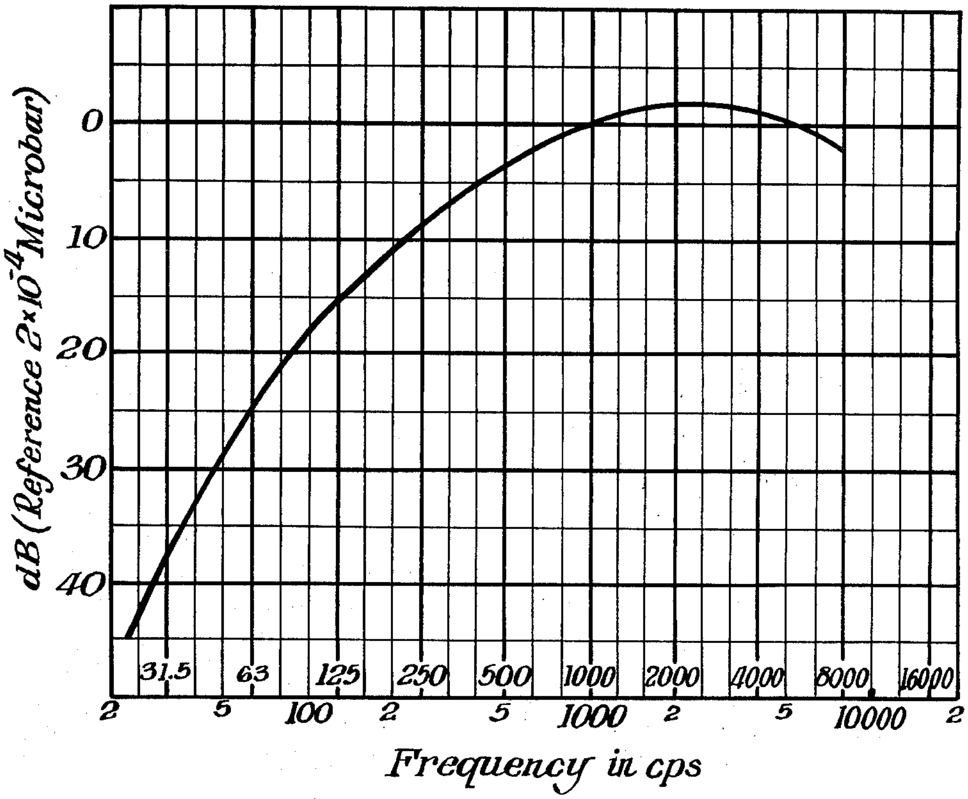
Figure 1:
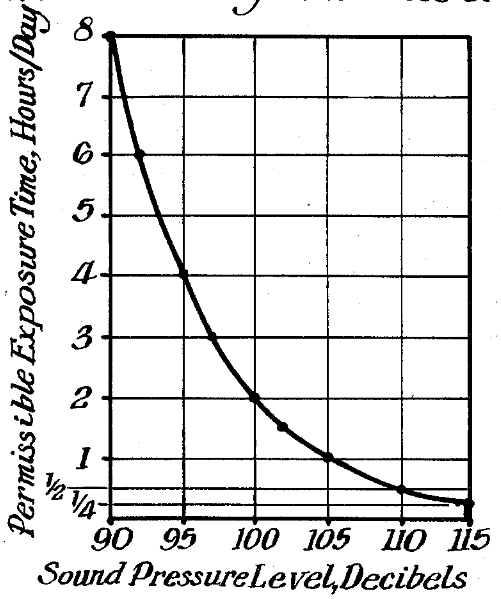

The "A" weighting network constituting the interstage coupling is made up of the two capacitors 28 and 29, each 0.1 mfd., and the two resistors 30 and 31, each 4990 ohms, 1 percent. This two-stage, high pass filter has the parameters prescribed by the applicable "A" weighting network standards set out in American National Standards Institute (ANSI) S1.4 (i.e., "-Specification for Sound Level Meters"). Each stage has a -3 db roll-off (i.e., drop-off in frequency response) at 280 Hz, and no high impedance buffer is to used between the stages. The "A" weighting attenuation in terms of decibels referred to $2 \times 10^{-4}$ microbar as ordinate v. frequency in cps as abscissa (logarithmic scale) is shown in FIG. 3.

Resistor 30 also constitutes the input resistor for a conventional gain 6 inverting amplifier 34, which can be an operational type, e.g., Philbrick-Nexus Model 1402. The feedback network consisting of parallel-connected resistor 35 (typically 30 Kohms) and capacitor 36 (typically 500 pf.) is provided for high frequency attenuation. Capacitor 36 causes frequency response roll-off to begin slightly above 10 Kilohertz.

The A-C voltage output from amplifier 34 is supplied to a full-wave, peak-storing rectifier network incorporating oppositely connected diodes 39 and 40 (typically each type 1N93A) connected to common potential reference at 45 through resistors 41 and 42, respectively (each, typically, 80 ohms), and capacitors 43 and 44, respectively (each, typically, 25 $\mu$f at 25 volts).

Diodes 39 and 40 have a preselected conductance level in terms of diode forward voltage drop effecting a limiting low voltage level signal input (typically above about ½ volt), minimizing circuit response below about 90 dB audio level.

Resistors 41 and 42 buffer the capacitors from amplifier 34, thereby averting instability (oscillation) Peak-storing capacitors 43 and 44 are interposed in circuit between the two branches of the rectifier and reference 45. These remove signal ripple but, more importantly, extend the time afforded for sharp, impulsive sound accommodation. In effect, the capacitors weight apparatus response in a conservative sense enhancing short term sound impulse recording. The action of the capacitors is to store a charge rapidly, but to discharge relatively slowly, i.e., peak-storing.

The output of the rectifier circuit is routed through microammeter 48 (typically, 500 microampere size), which is provided merely as a circuit functioning check, and thence to electrochemical integrating cell 49, which can typically be a Bissett-Berman Model 400–0001 rated for about 200 microampere hours full charge.

"Slope" rheostat 50, typically 50 Kohms, converting the voltage signal into a current flow, is interposed between microammeter 48 and integrating cell 49.

Figure 2A:
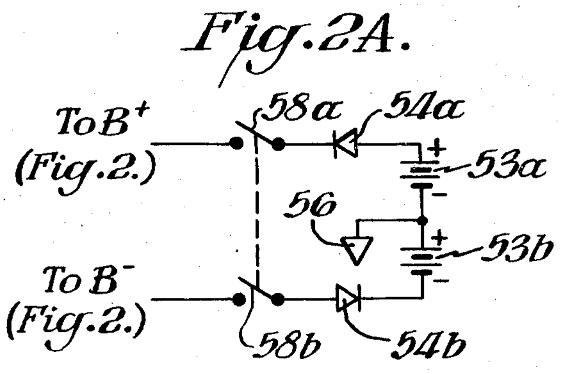

Operating voltage for the circuit is provided by two 22½ volt cells 53*a*, 53*b* shown schematically in FIG. 2A with $B^+$ and $B^-$ terminals denoted, corresponding $B^+$ and $B^-$ connection points to the circuit of FIG. 2 being denoted at amplifiers 11 and 34 thereof. Diodes 54*a* and 54*b* (each typically type 1N93A) protect against reverse insertion of the batteries, and center tap 56 connects to reference voltage level. Connection with the measuring circuit of the audio dosimeter is via ganged single-pole, single-throw switches denoted at 58*a*, 58*b*.

Figure 4:
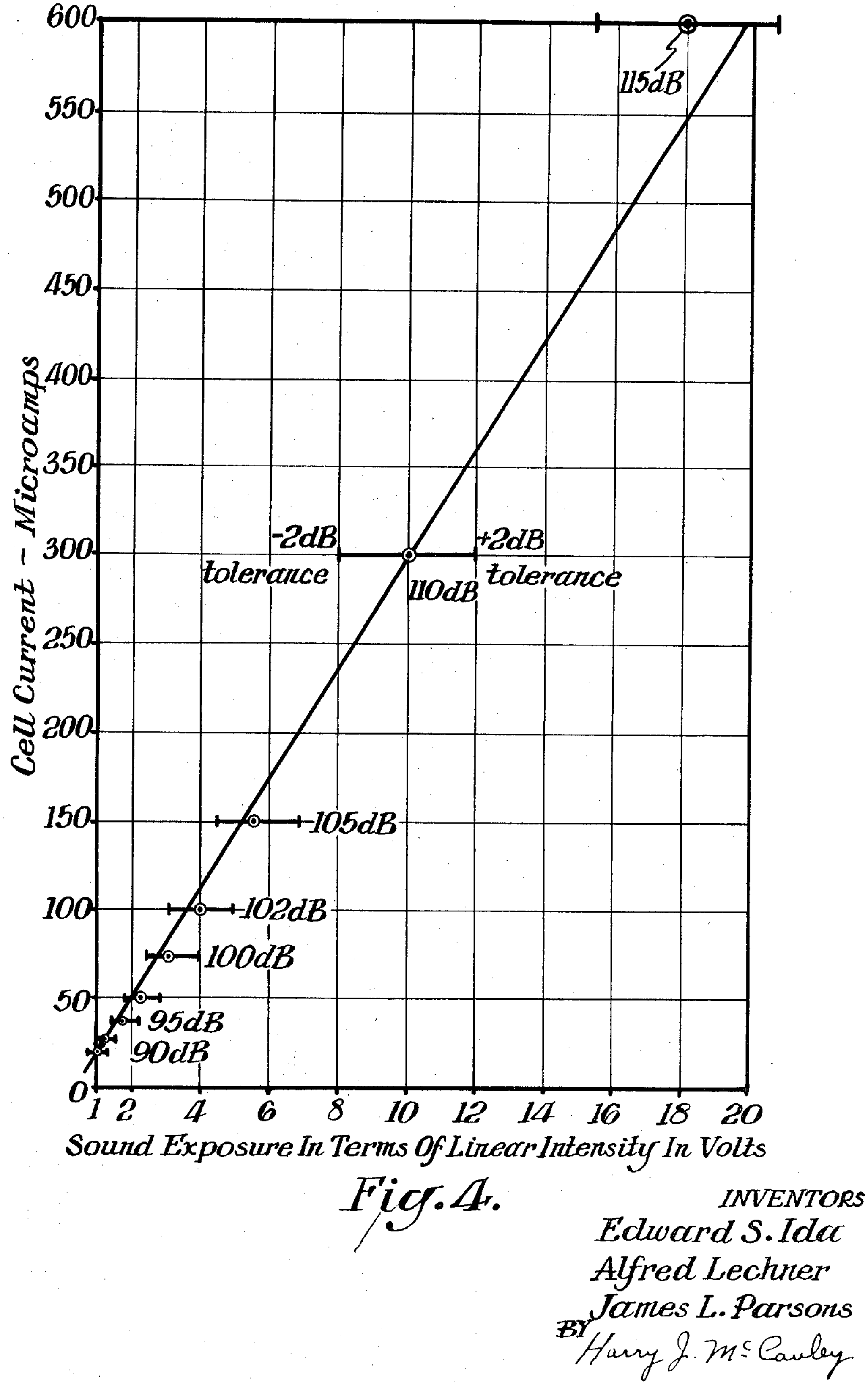

The operating performance in terms of cell current in microamperes as ordinate v. sound exposure in terms of linear intensity in volts as abscissa is plotted as FIG. 4 for a typical audio dosimeter constructed according to this invention.

A measurement range of 150 microampere hours has been found adequate to monitor the intensity-time produce permitted by the Walsh-Healey Law in a typical light industry manufacturing plant as an example.

Thus at 90 dB, a cell current of 18.75 microamperes accumulated for 8 hours results in the 150 microampere hour integral desired. At 100 dB the cell current should be 75 microamperes so that only 2 hours' exposure will develop a 150 microampere hour integral, and so on for each dBA vs. duration listed in Table I. These points are the circled dots on the plot. While they do not fall on a straight line, the ± dB tolerance bands adjacent the points show that a straight line approximation will fall well within ±2 of the ideal. This is considered to be quite acceptable and, in actual calibration of seven apparatuses, the error was measured to be 1 dB or less for all points except at 115 dBA, where the error was found not to exceed 1.6 dBA.

Calibration of the audio dosimeter is easily accomplished using rheostats 22 and 50 together. Thus, 5 Kohm rheostat 22 serves as a trimmer resistor, adjusting the gain of the input stage, amplifier 11. It should be initially set to approximately 3000 ohms, so that the stage gain at outset will be approximately 12.

The 50 Kohm rheostat 50, in series with integrating cell 49, should be initially set for about 32,000 ohms.

In subsequent calibration, employing a 3Kc audio oscillator in series with a 460 pf. capacitor as simulation for microphone 10, it has been found that, for 90 dB input level, the input "gain" rheostat 22 exerts the greatest effect, whereas, at 115dB input, the output "-slope" rheostat 50 exerts greatest influence. Of course, the two still interact, and thus, after each adjustment of one, the other should be checked.

Experience has shown that, by calibrating to essentially zero error at 95 and 110 dBA, the balance of the calibration points will show minimum average error.

A second embodiment of this invention is shown in part in FIG. 2B, all components of which, including amplifier 34′ and preceding gear, are identical with those shown in FIGS. 2 and 2A, and therefore not repeated in showing, whereas corresponding items which are shown are denoted by the same reference numerals, but with primes appended. This embodiment is somewhat less conservative in response that that of FIGS. 2 and 2A, and is actually a slow response, quasi rms type.

Here a conventional full-wave bridge rectifier incorporating the diodes 60*a*, 60*b*, 60*c*, and 60*d* is utilized, modified, however, by shunt-connecting a capacitor 62 across its output terminals, while connecting the remaining terminal to reference potential level 63. A resistor 66 is interposed between amplifier 34′ and the bridge rectifier-capacitor network in order to isolate the amplifier 34′ from capacitors 62 and 64, thereby averting instability (oscillation). Resistor 41′ on the one side is balanced by rheostat 50′, which latter is shifted to a new position in the circuit as compared with the circuit of FIG. 2. Capacitor 64, preselected to have a substantially greater capacitance value than capacitor 62, is shunted across the output sides of the rectifier bridge. In parallel with capacitor 64 there is connected microammeter 48′ and integrating cell 49′, between which is interposed a voltage-to-current converting resistor 65.

In the absence of capacitor 62, the circuit constitutes a full-wave rectifier with an averaging filter, the time constant of which is dominated by the product of resistance 65 and capacitance 64. Thus, it exhibits an equal, and relatively slow, rise and fall response time. However, adding capacitor 62, which is much smaller than capacitor 64, contributes a measure of peak-strong, which adds to the averaging action. Since rms values for a sine wave input are between the average and the peak values, there is obtained a quasi rms value of signal output which can be integrated by the electrochemical cell 49′ as hereinbefore described for the circuit of FIG. 2 and 2A. Again, rheostat 50′ is used to provide calibration trim, while rheostat 22 (not shown in FIG. 2B) would be set for somewhat higher gain in order to compensate for the voltage drop of the two extra diodes utilized in the bridge rectifier.

In service, it is practicable to maintain an audio dosimeter bank from which each employee draws his own freshly discharged unit at the beginning of his work shift. At the completion of the work tour the employee returns his audio dosimeter to the bank, where the integrating cell is connected across the terminals of a commercial read-out device (e.g., a Bissett-Berman Model 300 EDR) and the stored exposure in electrochemical integrating cell 49 (or 49′) read out and recorded as the sound exposure to which the employee was subjected on the date involved.

Of course, alternatively, one employee of a group could be monitored and identical sound exposures allocated to all others in the same environment. Or, if desired, individual dosimeters could be mounted statically in specific work areas and the sound exposure profiles obtained for each area, independent of employee travel. Individual employee exposures can then be approximated on the basis of their residence times in the areas.

It might be mentioned that rheostats 22 and 50 afford a relatively wide range of adjustment to accommodate changes in legally prescribed sound exposure limits, should these be made from time to time. In addition, the general apparatus design is such as to permit ready and economical substitution of individual components if wear or altered performance requirements necessitate.

What is claimed is:

1. An audio dosimeter for individual use comprising, in series circuit in the order recited, electronic microphonic sound sensor means, a high impedance first operational amplifier receiving the A-C voltage output of said sound sensor means, and "A" weighting network receiving the A-C voltage output constituting a measure of the ambient sound energy magnitude from said high impedance first operational amplifier and shaping it to conform to a preselected frequency attenuation pattern incorporating in said A-C voltage signal the otolaryngologically (and psychologically) harmful contribution of ambient sound frequency, a second operational amplifier effecting a preselected gain and final high frequency attenuation of said A-C voltage signal, a full-wave rectifier provided with diodes having a preselected threshold conductance effecting a limiting low voltage level signal input, each output side of said rectifier having a resistor in series connection therewith, a capacitor having a capacitance effecting substantial peak-storing action connected in shunt with respect to said rectifier and said resistors, and an electrochemical integrating cell in shunt connection with said capacitor measuring sound exposure in terms of sound pressure with weighted frequency and time of exposure conjointly.

2. An audio dosimeter for individual use according to claim 1 wherein said rectifier comprises a pair of oppositely connected diodes and said capacitor comprises a pair of series-connected peak-storing capacitor units of substantially equal capacitance having adjoining elements thereof connected to common potential reference.

* * * * *

PO-1050
(5/69)

UNITED STATES PATENT OFFICE
CERTIFICATE OF CORRECTION

Patent No. 3,696,206 Dated October 3, 1972

Inventor(s) EDWARD S. IDA; ALFRED LECHNER; and JAMES L. PARSONS

It is certified that error appears in the above-identified patent and that said Letters Patent are hereby corrected as shown below:

Col. 2, line 8, "178" should be --1/2--
Col. 2, line 12, "nose" should be --noise--
Col. 3, line 53, "80 ohms" should be --180 ohms--
Col. 4, line 33, "produce" should be --product--
Col. 5, line 8, "that that" should be --than that--.

Signed and sealed this 12th day of November 1974.

(SEAL)
Attest:

McCOY M. GIBSON JR.
Attesting Officer

C. MARSHALL DANN
Commissioner of Patents